United States Patent [19]

Cheng et al.

[11] Patent Number: 4,924,829
[45] Date of Patent: May 15, 1990

[54] APPARATUS FOR TORCH JET ASSISTED SPARK IGNITION

[75] Inventors: Shi-wai S. Cheng, Troy; Wayne C. Nichols, Corunna; Wayne R. Moore, Highland, all of Mich.

[73] Assignee: General Motors Corporation, Detroit, Mich.

[21] Appl. No.: 405,241

[22] Filed: Sep. 11, 1989

[51] Int. Cl.$^5$ .............................................. F02B 19/10
[52] U.S. Cl. ................................. 123/259; 123/266; 123/286; 123/169 PA; 313/143
[58] Field of Search ...... 123/143 B, 169 PA, 169 PH, 123/259, 266, 286; 313/123, 141, 142, 143

[56] References Cited

U.S. PATENT DOCUMENTS

| | | | |
|---|---|---|---|
| 1,399,375 | 12/1921 | Blodgett et al. | 313/143 |
| 1,399,376 | 12/1921 | Blodgett et al. | 313/143 |
| 1,891,693 | 12/1932 | Smith et al. | 313/123 |
| 2,122,242 | 6/1938 | Bidwell | 313/141 |
| 3,921,605 | 11/1975 | Wyczakel | 123/143 B |
| 3,980,057 | 9/1976 | Sanda et al. | 123/259 |
| 4,043,309 | 8/1977 | Kato et al. | 123/286 |
| 4,096,844 | 6/1978 | Mackaness | 123/193 P |
| 4,105,009 | 8/1978 | Resler, Jr. | 123/193 M |
| 4,112,877 | 12/1978 | Goto et al. | 123/258 |
| 4,175,531 | 11/1979 | Tanahashi | 123/286 |
| 4,175,533 | 11/1979 | Goto et al. | 123/256 |
| 4,206,381 | 6/1980 | Wax | 313/139 |
| 4,272,697 | 6/1981 | Wax | 313/123 |
| 4,393,830 | 7/1983 | Bodine | 123/272 |
| 4,566,413 | 1/1986 | Maly | 123/256 |
| 4,639,635 | 1/1987 | Lee | 313/123 |

FOREIGN PATENT DOCUMENTS 3305153 8/1984 Fed. Rep. of Germany ...... 313/123

*Primary Examiner*—Tony M. Argenbright
*Assistant Examiner*—Robert E. Mates
*Attorney, Agent, or Firm*—Robert J. Outland

[57] ABSTRACT

Torch jet ignition is used to assist conventional spark ignition. A small (0.5-1 cc) chamber in a spark plug has an orifice (0.1-0.2 cm diameter) adjacent the spark gap to emit a torch jet into the main combustion chamber to enhance the combustion. The combustion is initiated by the conventional spark in the combustion chamber and the combustion ignites the torch jet. In another embodiment, two spark gaps in series are used, one in the main combustion chamber and one in the torch chamber.

12 Claims, 3 Drawing Sheets

4,924,829

APPARATUS FOR TORCH JET ASSISTED SPARK IGNITION

TECHNICAL FIELD

This invention relates to a spark ignition apparatus and particularly to such apparatus combining torch jet ignition with conventional spark devices.

BACKGROUND

A fast burning engine is known to have low cyclic variation in cylinder pressure as well as greater resistance to engine knock. This leads to higher engine efficiency through higher compression ratio.

One way to achieve fast burning is torch jet ignition. A typical torch jet igniter comprises a large prechamber coupled to a main combustion chamber through a large orifice, usually greater than 5 mm, and a spark plug in the prechamber. The volume of the prechamber is 3 to 12% of the clearance volume. Since ignition occurs in the prechamber, the mixture in the prechamber is very critical; therefore, a valve in the prechamber is normally required to provide a fresh mixture to the prechamber. After ignition, the burned mixture in the prechamber will expand into the main combustion chamber through the orifice and form a torch jet. The enhanced burning rate comes from the higher turbulence induced by the jet and from the larger flame front area created by the torch jet at its boundary. In some cases special valving has been avoided.

An example of a torch jet ignition system without special valving is shown in U.S. Pat. No. 3,921,605 to Wyczalek which proposes a large prechamber having a volume of 2 to 10% of the total clearance volume, a range of 5 to 15 cubic inches of volume for each square inch of orifice area, an orifice size of about 3.6 mm in diameter, and a special spark plug within the chamber. On the other hand, U.S. Pat. No. 4,112,877 to Goto et al discloses a prechamber with special valve arrangements for introducing a fresh air-fuel mixture into the chamber. The spark plug is remote from the prechamber. Another example of prechamber devices is in U.S. Pat. No. 4,096,844 to Mackaness which shows various styles including a prechamber remote from the spark plug and a prechamber containing a spark plug. The prechambers appear to be quite large but no dimensions are given.

The disadvantages of providing for the large prechamber and for providing any special valving are evident. It is also apparent that with this arrangement, an engine must be specially designed to take advantage of the torch jet ignition. The present invention proposes a new way to achieve fast burning using a torch jet which requires a very small torch chamber (smaller than 1% of the volume of the main combustion chamber) and can even fit within a spark plug for use in any engine. Moreover, no valving is needed.

Small chambers associated with ignition and even chambers incorporated in spark plugs are already known. For example, U.S. Pat No. 4,639,635 to Lee discloses an extremely small chamber (28 mm 3 volume) having two spark gaps, one within the chamber to effect heating and discharge of the gas from the chamber and another in the gas discharge path to ionize the gas thereby producing a low energy plasma jet.

SUMMARY OF THE INVENTION

It is therefore an object of the invention to provide the advantages of torch jet ignition in an engine without any substantial modification of the basic engine.

It is another object of the invention to provide the advantage of torch jet ignition in an existing engine.

Still another object is to incorporate a prechamber in a standard size spark plug with optimum dimensions to exploit the advantages of torch jet ignition in any engine equipped with the spark plug.

The invention is carried out by torch jet assisted spark ignition means in combination in an internal combustion engine with a closed end cylinder and a piston in the cylinder defining a variable volume combustion chamber at the cylinder closed end, said ignition means comprising: electrically conductive means supported on a wall of the cylinder and forming a spark gap adjacent the wall, a torch chamber communicating with the combustion chamber through an orifice in said wall adjacent the spark gap and directed into the combustion chamber, the torch chamber volume being in the range of from 0.5 to 1.0 cc and the orifice diameter being in the range of from 0.1 to 0.2 cm.

The invention is further carried out by a torch jet spark plug for an internal combustion engine, said plug comprising: a body having mounting means near one end adapted to form a part of an engine combustion chamber, electrically conductive means on said one end and forming a spark gap closely adjacent to said end and adapted to reside in said combustion chamber when installed to ignite charges of compressed air-fuel mixture therein, a torch chamber formed within said body adjacent said end, said torch chamber having a volume in the range of from 0.5 to 1.0 cc, and an orifice extending through said end from the torch chamber for connecting it with the combustion chamber when installed, the opening of the orifice through the end being close to but offset from the spark gap, said orifice having a diameter in the approximate range of from 0.1 to 0.2 cm.

BRIEF DRAWING DESCRIPTION

The above and other advantages of the invention will become more apparent from the following description taken in conjunction with the accompanying drawings wherein like references refer to like parts and wherein.

DETAILED DESCRIPTION

The present invention utilizes torch jet assisted spark ignition In contrast to torch jet ignition, it uses the torch jet phenomenon in conjunction with conventional spark ignition in the main combustion chamber, and it requires a very small torch chamber, less than 1.5% by volume of the main combustion chamber. By using a small orifice, usually about 0.15 cm diameter, and a proper orifice area-to-volume ratio, an effective jet is expelled from the orifice and causes a large flame front area which results in a fast burn.

Figure 1:
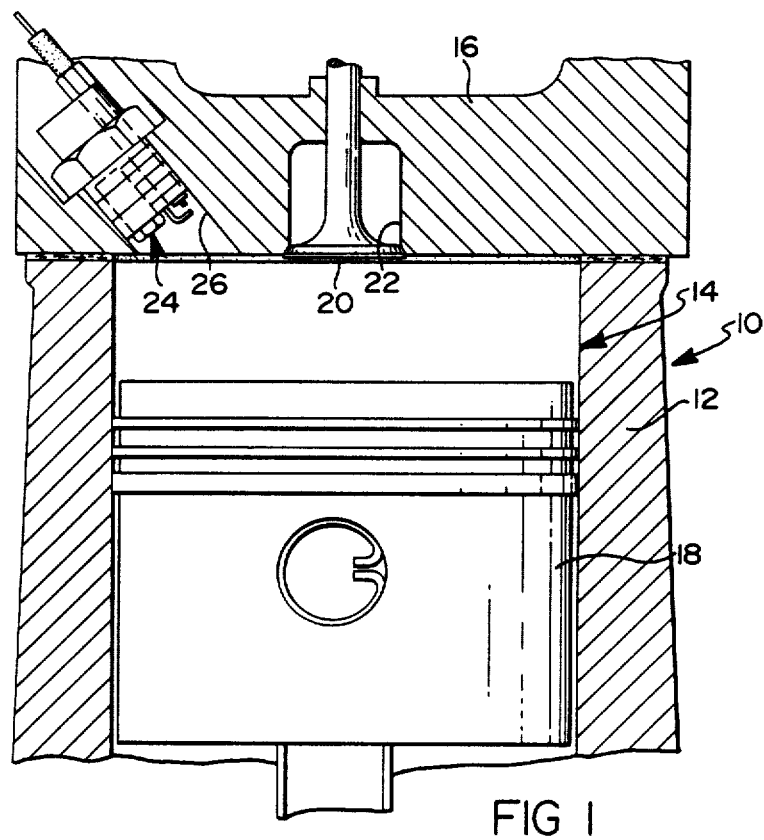
FIG. 1 is a cross section view of an engine combustion chamber equipped with a torch jet assisted spark ignition according to one embodiment of the invention.

Referring to FIG. 1, a cross section of an engine 10 includes a block portion 12 forming the side wall of a cylinder 14, a head 16 forming an end wall of the cylinder, and a piston 18 in the cylinder to define a variable volume combustion chamber. The head includes a valve 20 seated in a port 22 and a torch jet spark plug 24 in a threaded bore 26. Thus the valve 20 and the spark plug 24 also form part of the cylinder wall.

Figure 2:
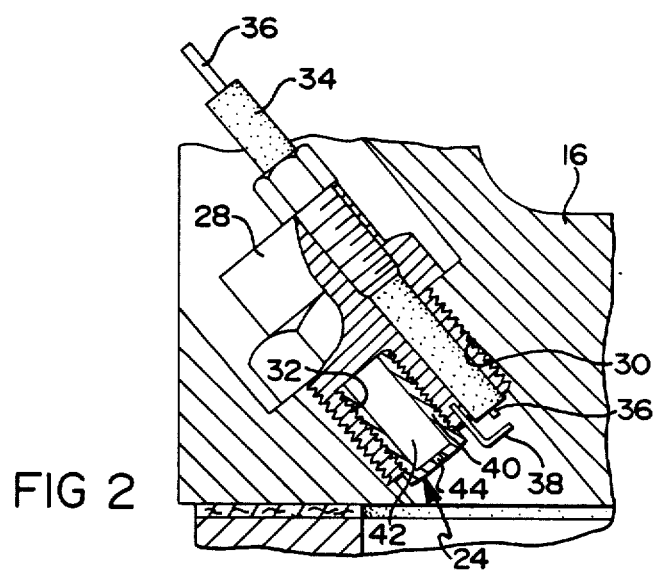
FIG. 2 is an enlarged view of the ignition device of FIG. 1.

The spark plug 24, as best shown in FIG. 2, has a housing 28 which is externally threaded on one end and contains two adjacent bores 30 and 32. The bore 30 extends through the full length of the housing 28 and contains an insulator 34 which carries a center electrode or wire 36 which extends beyond the end of the insulator and beyond the end of the housing 28. An L-shaped side electrode or wire 38 is welded to the housing 28 adjacent the protruding center wire and forms a spark gap with the center wire. The bore 32 is closed ended and extends into one end of the housing adjacent the side wire 38. The bore 32 is internally threaded to receive a cup-shaped chamber closure 40 which is externally threaded to mate with the bore to define an enclosed torch chamber 42. The outer end of the closure 40 contains an orifice 44 which couples the torch chamber with the main combustion chamber.

The dimensions of the torch chamber 42 are important to its successful operation. In absolute terms, the most effective operation occurs for a torch chamber volume in the range of 0.5 to 1 cc with optimum performance at about 0.7 cc or above. The volume should be no more than 1.5% and preferably is less than 1% of the minimum volume of the main combustion chamber, i.e., when the piston 18 is at top dead center. The value of such a small relative volume is that as combustion proceeds in both volumes, a high pressure is developed in the torch chamber while the pressure is still low in the main chamber so that a jet of burning gases shoots far into the main chamber. In order to develop such a pressure differential the orifice must be small enough to contain the pressure in the torch chamber for a time sufficient for combustion to advance through the torch chamber. An orifice diameter of 0.2 cm or less has been found to be sufficient for that purpose. The orifice must, however, be large enough to quickly expel the jet and also to recharge the chamber with a fresh air-fuel mixture by expelling the residual gas during the exhaust stroke of the engine and drawing in gas during the compression stroke. The orifice diameter should be at least 0.1 cm to accommodate this recharging action. In particular, tests have shown that the pressure of the torch chamber tracks the pressure of the main chamber for an orifice diameter of 0.15 cm and this size orifice is preferred, although the diameter range of 0.1 to 0.2 is acceptable.

A descriptor for the torch chamber dimensions is the characteristic length which equals the torch chamber volume in cubic centimeters divided by the orifice area in square centimeters. Limiting values are a characteristic length of 15 cm for a volume of 0.5 cc and a diameter of 0.2 cm, and a characteristic length of 127 cm for a volume of 1 cc and a diameter of 0.1 cm. For the preferred orifice diameter of 0.15 cm and the maximum volume of 1 cc, the characteristic length is 57 cm. The 0.15 cm orifice and the minimum volume, 0.5 cc, yield the characteristic length of 26 cm. In operation, the ignition of the air-fuel mixture occurs in the main combustion chamber. The initial phase of combustion is the same as that during regular spark ignition. As soon as the flame front initiated by the spark plug reaches the orifice 44, it ignites the charge in the torch chamber. As the burned gas in the torch chamber expands into the main combustion chamber, it creates a torch jet which shoots into the main chamber and increases the combustion rate in the main chamber. Laboratory measurements of torch jet assisted ignition showed the minimum spark advance for best torque (MBT) to be improved as much as seven degrees of crank angle over standard spark ignition, i.e., an engine which delivered the best torque at a spark setting of 14° BTDC with standard spark plugs gave the best torque at a spark setting of 7° BTDC with the torch jet assisted ignition. While a variety of dimensions were tested, the best result (fastest combustion) was obtained by a spark plug having a prechamber volume of 0.775 cc (0.887% of main cylinder volume) and an orifice diameter of 0.15 cm. Tests have also shown that the system operates with the spark gap spaced ⅛ inch from the orifice but better performance occurs with the spark gap as close as possible to the orifice (e.g., 1/16 inch).

There are several advantages for having the spark plug in the main chamber rather than in a combustion chamber. First, the spark plug can generate a flame front. The effect of an additional flame front generated by the torch jet is equivalent to the effect of having a second spark plug. Second, since the ignition occurs in the main combustion chamber, the mixture in the torch chamber is not as critical as that in the prechamber of a torch jet igniter. Therefore, the torch chamber can be a blind cavity. Moreover, since the mixture in the torch chamber is ignited by the flame propagating into the torch chamber, all the charge in the torch chamber is used to drive the torch jet; as a consequence, the amount of charge in the torch chamber can be small.

Figure 3:
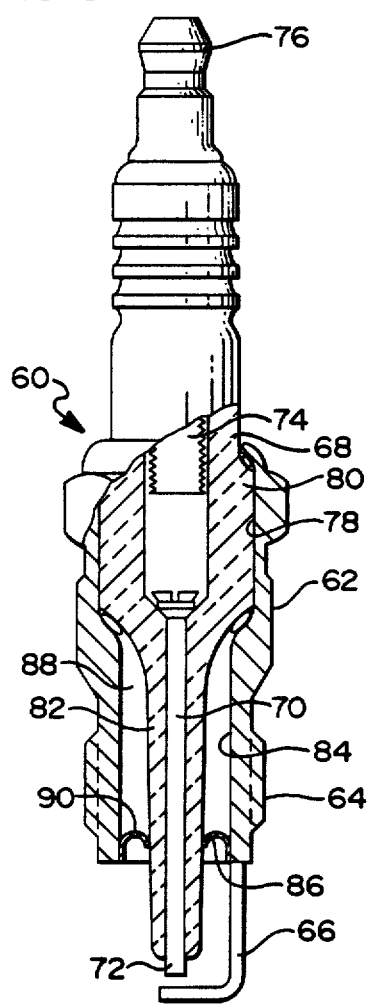
FIG. 3 is a partially cross sectioned view of a spark plug equipped with a torch chamber according to a second embodiment of the invention.

A spark plug with 14 mm threads to fit most production engines and incorporating the prechamber design requirements is shown in FIG. 3. This plug 60 superficially resembles a conventional spark plug and comprises a steel shell 62 with a threaded end 64, an L-shaped side wire 66 attached to the end of the shell, a hollow central insulator 68 crimped into the shell, a center wire 70 in the hollow insulator having an end 72 extending beyond the insulator 68 to a point adjacent the side wire 66 to form a spark gap, and a resistor 74 in the insulator for coupling the center wire 70 to a terminal 76. The shell 62 has an enlarged bore 78 at the end of the shell opposite the threaded end 64 and the insulator has an enlarged body portion 80 which fits within the bore 78 and is clamped in place by crimps on the shell. The insulator reduces down from the enlarged body portion 80 to a thin slightly tapered sleeve 82 extending through the threaded end 64 and spaced from the inner wall 84 of the shell 62.

Figure 4:
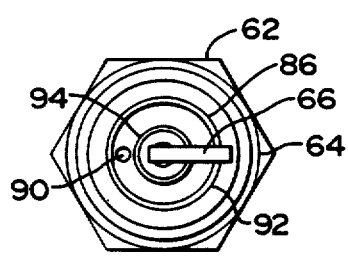
FIG. 4 is a front view of an orifice plate used in the embodiment of FIG. 3.

A metal end enclosure or orifice plate 86 is fastened in the end 64 of the shell to bridge the annular gap between the insulator sleeve 82 and the shell. The enclosure defined by the inner wall 84 of the shell, the sleeve 82 and the orifice plate 86 comprises the prechamber 88. The orifice 90 is formed in the orifice plate 86 as shown in FIG. 4. The orifice plate 86 is an annular concave washer with both the outer periphery and the inner periphery terminating in flanges 92 and 94 respectively, with the concave side facing away from the prechamber and toward the spark gap. The outer flange 92 is welded to the rim of the shell end 64 to form a seal and the inner flange is press fit over the sleeve 82 to make a tight seal. The orifice plate must accommodate the expansion of the steel shell and yet retain a firm seal on the sleeve 82.

During installation, the slight taper of the sleeve is forced into the center hole of the orifice plate. The ceramic sleeve actually abrades the inner flange 94 as the orifice plate is pressed into position. The outer flange 92 is also a press fit to the shell inner wall 84. It is these two interference fits that provide the internal stress in the plate so that the seal between the orifice plate and the insulator is maintained during operation. The concave shape of the orifice plate allows the outer edge to expand along with the steel shell and the inner edge to remain tightly fixed to the central sleeve thus providing the necessary seal between the torch chamber and the main combustion chamber. The orifice plate material (Inconel) and its thickness provide the proper expansion rates to allow the above to occur. To insure retention and a perfect seal, the outer flange 92 is TIG welded completely around its periphery to the shell. The insulator 68, the shell 62 and the resistor 74 use essentially the same materials as conventional production plugs.

Figure 5:
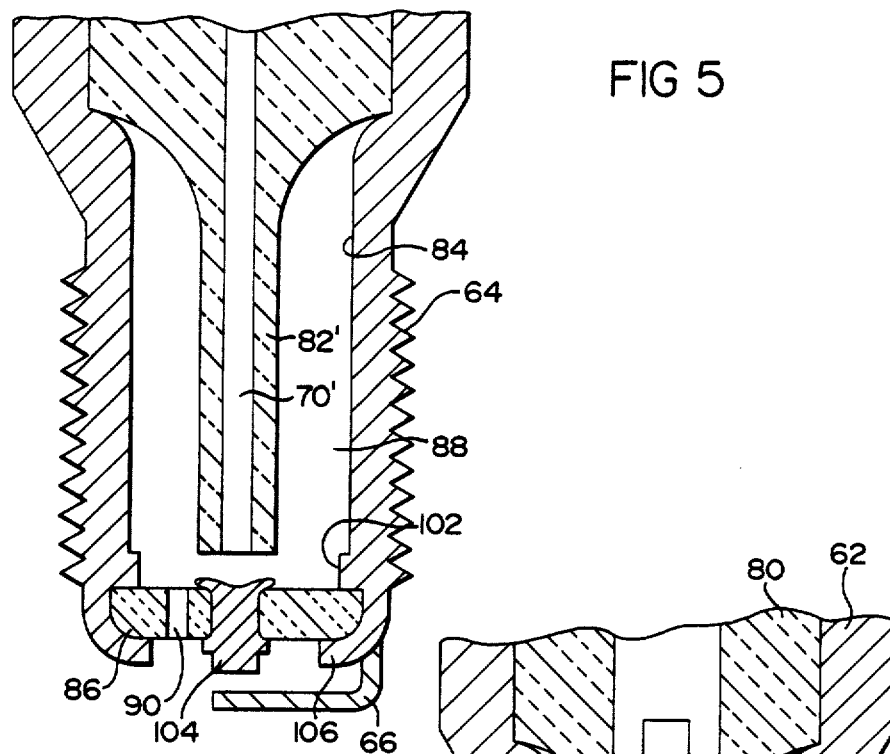
FIG. 5 is a cross sectioned view of an end of a spark plug equipped with a torch chamber according to a third embodiment of the invention.
Figure 6:
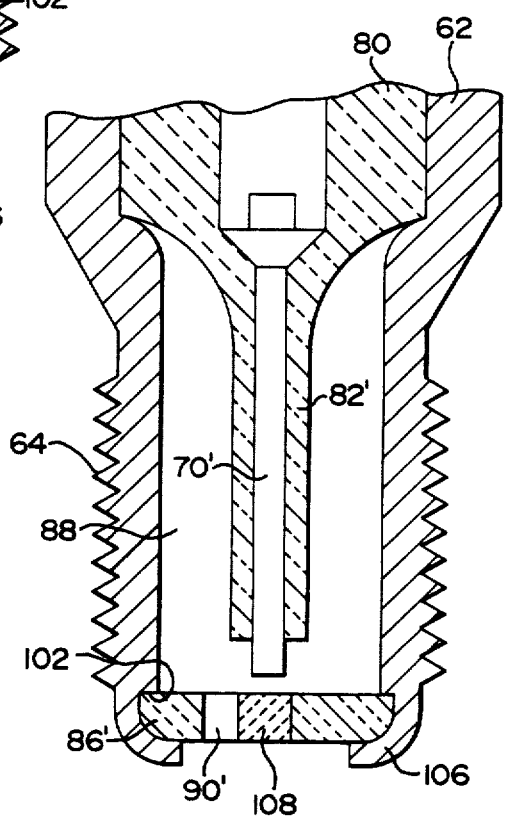
FIG. 6 is a cross sectioned view of an end of a spark plug equipped with a torch chamber according to a fourth embodiment of the invention.

The embodiments of FIGS. 5 and 6 introduce another feature: two spark gaps in series with the second gap inside the prechamber. The prechamber and orifice dimensions discussed above apply to these embodiments. The structure of these plugs is the same as that of FIG. 3 except in the region of the end 64. In FIG. 5 the inner wall 84 of the shell has a shoulder 102 near the end of the shell. The orifice plate 86 comprises a ceramic disc centrally apertured to receive a metal rivet 104 which serves as an additional electrode. The center wire 70' and the insulator sleeve 82' are foreshortened, relative to that of FIG. 3, to terminate within the prechamber 88. The orifice plate 86 is seated on the shoulder 102 and crimped in place by an end flange 106 of the shell. The side wire 66 extending from the shell end 64 is spaced from the outer end of the rivet 104 to form the spark gap in the main combustion chamber while the space between the center wire 70' and the rivet form the second spark gap in the prechamber 88.

In operation, the center wire 70' is energized in the customary manner and two sparks occur at the two gaps as the current flows serially from the center wire 70' to the rivet 104 and to the grounded side wire 66. Combustion begins simultaneously in the prechamber and the main combustion chamber. Thereafter the process continues as in the FIGS. 2 and 3 embodiments such that a torch jet is emitted from the orifice 90 to assist in the combustion. With this spark plug geometry, the plug can run cooler than the FIG. 3 embodiment which protrudes further into the main chamber.

The FIG. 6 embodiment is the same as FIG. 5 except that the rivet 104 on the plate 86' is supplanted by a center conductor or electrode 108 comprising a conductive cermet material and the side wire is supplanted by the end flange 106 which is lengthened to reach close enough to the center conductor 108 to form a surface spark gap. The conductive cermet material is, for example, alumina doped 10% by volume with platinum. The ceramic orifice plate 86' and the conductive center are conveniently formed in the green state and sintered at the same time to yield an integral piece with different conductive properties in different areas. In this embodiment the spark jumps from the center wire 70' to the conductive cermet 108 and to the end flange 106.

Figure 7:
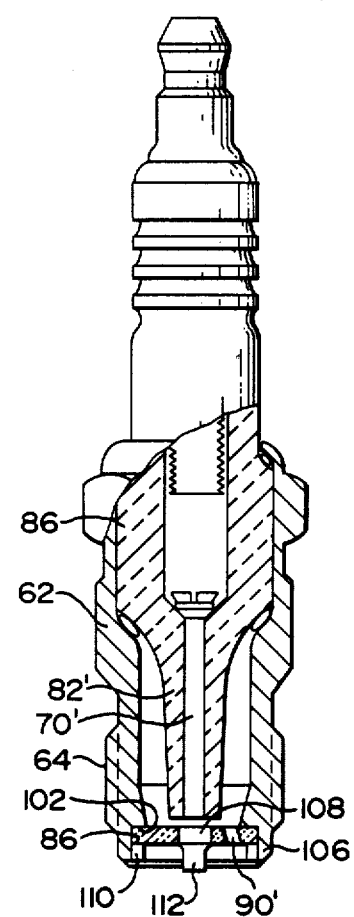
FIG. 7 is a cross sectioned view of an end of a spark plug equipped with a torch chamber according to a fifth embodiment of the invention.
Figure 8:
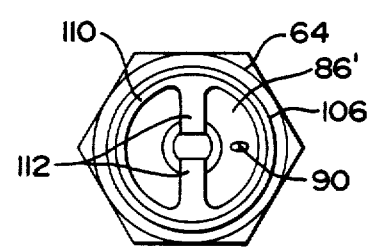
FIG. 8 is an end view of the spark plug of FIG. 7.

The implementation shown in FIGS. 7 and 8 is similar to FIG. 6 which uses the ceramic disc 86' with the conductive cermet center 108. The orifice 90 in the ceramic disc 86' is at an angle to the plug center axis. The end flange 106, instead of being crimped, is straight and a retaining ring 110 welded to the nose of the end flange holds the ceramic disc against the shoulder 102. A pair of side wires 112 welded to the retaining ring 110 extend radially inwardly toward each other and terminate short of each other over the cermet center 108 to form a pair of gaps between the cermet 108 and the side wires 112. The gap between the center wire 70' and the cermet center 108 is, for example, 0.05 cm and the gap between the cermet center 108 and the side wires 112 is 0.1 cm. In this embodiment the spark jumps from the center wire 70' to the conductive cermet 108 and to the side wires 112.

The embodiments of the invention in which an exclusive property or privilege is claimed are defined as follows:

1. Torch jet assisted spark ignition means in combination in an internal combustion engine with a closed end cylinder and a piston in the cylinder defining a variable volume combustion chamber at the cylinder closed end, said ignition means comprising:
   electrically conductive means supported on a wall of the cylinder and forming a spark gap adjacent the wall,
   a torch chamber communicating with the combustion chamber through an orifice in said wall adjacent the spark gap and directed into the combustion chamber, the torch chamber volume being in the range of from 0.5 to 1.0 cc and the orifice diameter being in the range of from 0.1 to 0.2 cm.

2. The invention as defined in claim 1 wherein said torch chamber volume is less than 1% of the minimum volume of said combustion chamber.

3. The invention as defined in claim 1 wherein the orifice diameter is at least 0.15 cm and the characteristic length of the torch chamber/orifice falls within the range of from 28 to 57 cm where characteristic length represents the value of the torch chamber volume in cubic centimeters divided by the orifice area in square centimeters.

4. Torch jet assisted spark ignition means in combination in an internal combustion engine with a closed end cylinder and a piston in the cylinder defining a variable volume combustion chamber at the cylinder closed end, said ignition means comprising
   electrically conductive means supported on a wall of the cylinder and forming a spark gap adjacent the wall,
   a torch chamber communicating with the combustion chamber through an orifice in said wall adjacent the spark gap and directed into the combustion chamber, wherein the torch chamber volume is equal to or less than 1.5% of the minimum volume of the combustion chamber, the orifice diameter is at least 0.1 cm and the characteristic length of the torch chamber/orifice falls within the range of from 15 to 127 cm where characteristic length represents the value of the torch chamber volume in cubic centimeters divided by the orifice area in square centimeters.

5. A torch jet spark plug for an internal combustion engine, said plug comprising:
   a body having mounting means near one end adapted to form a part of an engine combustion chamber,
   electrically conductive means on said one end and forming a spark gap closely adjacent to said end and adapted to reside in said combustion chamber when installed to ignite charges of compressed air-fuel mixture therein,
   a torch chamber formed within said body adjacent said end, said torch chamber having a volume in the range of from 0.5 to 1.0 cc, and
   an orifice extending through said end from the torch chamber for connecting it with the combustion chamber when installed, the opening of the orifice through the end being close to but offset from the spark gap, said orifice having a diameter in the approximate range of from 0.1 to 0.2 cm.

6. The invention as defined in claim 5 wherein the orifice diameter is at least 0.15 cm and the characteristic length of the torch chamber/orifice falls within the range of from 28 to 57 cm where characteristic length represents the value of the torch chamber volume in cubic centimeters divided by the orifice area in square centimeters.

7. The invention as defined in claim 5 wherein the characteristic length of the torch chamber/orifice falls within the range of from 15 to 127 cm where characteristic length represents the value of the torch chamber volume in cubic centimeters divided by the orifice area in square centimeters.

8. The invention as defined in claim 5 wherein the said electrically conductive means includes second spark gap means within the torch chamber for igniting the air-fuel mixture therein.

9. The invention as defined in claim 5 wherein the electrically conductive means comprises a first electrode which is grounded when installed and a second electrode separated by the said spark gap, the second electrode being connected into the torch chamber, and a third electrode in the torch chamber and spaced from the second electrode to form a second spark gap in series with the first said spark gap, whereby the spark gaps are adapted to spark simultaneously to ignite air-fuel mixtures in both the said combustion chamber and the said torch chamber.

10. The invention as defined in claim 5 wherein the electrically conductive means comprising a plurality of electrodes, the spark plug body comprises a metal shell having an end terminating in a first electrode, a second electrode within the shell and spaced from the shell to form the said torch chamber, and an apertured closure over the shell end between the first and second electrodes to complete the chamber and define the orifice from the torch chamber, a third electrode carried by the closure and positioned between the second electrode and the first electrode to form two spark gaps in series, the two spark gaps consisting of the said spark gap in the combustion chamber and a second spark gap in the torch chamber.

11. The invention as defined in claim 5 wherein the spark plug body comprises a metal shell having an end and the electrically conductive means comprising a plurality of electrodes, a first electrode connected to the end of the shell, a second electrode within the shell and spaced from the shell, and an apertured closure over the shell end to form the said torch chamber and to define the orifice from the torch chamber, the second electrode extending through the closure to a point near the first electrode to define the said spark gap.

12. The invention as defined in claim 5 wherein the said body is a hollow metal shell and the electrically conductive means includes a side electrode which protrudes from the said one end of the body into the said combustion chamber and a center electrode which extends through the center of the shell to a point near the side electrode to form the said spark gap,
   an insulator laterally surrounding the center electrode within the shell and spaced from the walls of the shell, and
   a disc having a central aperture snugly fitting over the insulator and welded at its periphery to the said one end of the body to enclose the space between the insulator and the shell wall to thereby define the torch chamber, the disc containing the orifice for connecting the torch chamber with the combustion chamber.

* * * * *